US012718133B2

(12) United States Patent
Tiwari et al.

(10) Patent No.: US 12,718,133 B2
(45) Date of Patent: Aug. 25, 2026

(54) UTILIZING QUANTUM COMPUTING AND A POWER OPTIMIZER MODEL TO DETERMINE OPTIMIZED POWER INSIGHTS FOR A LOCATION

(71) Applicant: Accenture Global Solutions Limited, Dublin (IE)

(72) Inventors: Sanjay Tiwari, Bengaluru (IN); Anshul Kapoor, Delhi (IN); Juhi Mandot, Udaipur (IN); Mayur Kolhe, Bengaluru (IN); Akhilesh Birur Krishnamurthy, Bengaluru (IN); Salil Bhatia, Hisar (IN)

(73) Assignee: Accenture Global Solutions Limited, Dublin (IE)

( * ) Notice: Subject to any disclaimer, the term of this patent is extended or adjusted under 35 U.S.C. 154(b) by 936 days.

(21) Appl. No.: 17/902,252

(22) Filed: Sep. 2, 2022

(65) Prior Publication Data

US 2024/0078463 A1 Mar. 7, 2024

(51) Int. Cl.
*G06N 10/60* (2022.01)
*H02J 3/00* (2006.01)

(52) U.S. Cl.
CPC .............. *G06N 10/60* (2022.01); *H02J 3/003* (2020.01)

(58) Field of Classification Search
CPC ................................ G06N 10/60; H02J 3/003
See application file for complete search history.

(56) References Cited

U.S. PATENT DOCUMENTS

2014/0281645 A1* 9/2014 Sen ......................... H02J 3/003 713/340
2020/0051182 A1* 2/2020 Fox ......................... H02J 3/004
2021/0182980 A1* 6/2021 Rahman ............. G06Q 30/0204

OTHER PUBLICATIONS

Frederiksen, "DTU First to Use Quantum Computer for the Power Grid," https://www.dtu.dk/english/news/all-news/dtu-first-to-use-quantum-computer-for-the-power-grid?id=f1c26196-6390-4065-a0da-0de55b4ab8b1, Jun. 17, 2022, 2 pages.
Davis, "Quantum Computing for the Future Grid," TD World, https://www.tdworld.com/smart-utility/data-analytics/article/21169579/quantum-computing-for-the-future-grid, Jul. 19, 2021, 18 pages.
Eskandarpour et al., "Quantum-Enhanced Grid of the Future: A Primer," IEEE Access, Oct. 28, 2020, 10 pages.

* cited by examiner

*Primary Examiner* — Nhat Huy T Nguyen
(74) *Attorney, Agent, or Firm* — Seed Intellectual Property Law Group LLP

(57) ABSTRACT

A device may receive input data that includes demographic data, power demand data, power source data, power route data, technology data, industry data, and problem data associated with a geographic location, and may identify a section of the geographic location from the demographic data. The device may identify power sources of the section, and may estimate power generation and power demand for the section. The device may determine whether the power demand is greater than the power generation for the section. The device may utilize a quantum computer and a power optimizer model with the input data associated with the section to determine optimized power insights for the section based on determining that the power demand is greater than the power generation for the section, and may perform actions based on the optimized power insights for the section.

18 Claims, 13 Drawing Sheets

Figure 1E:
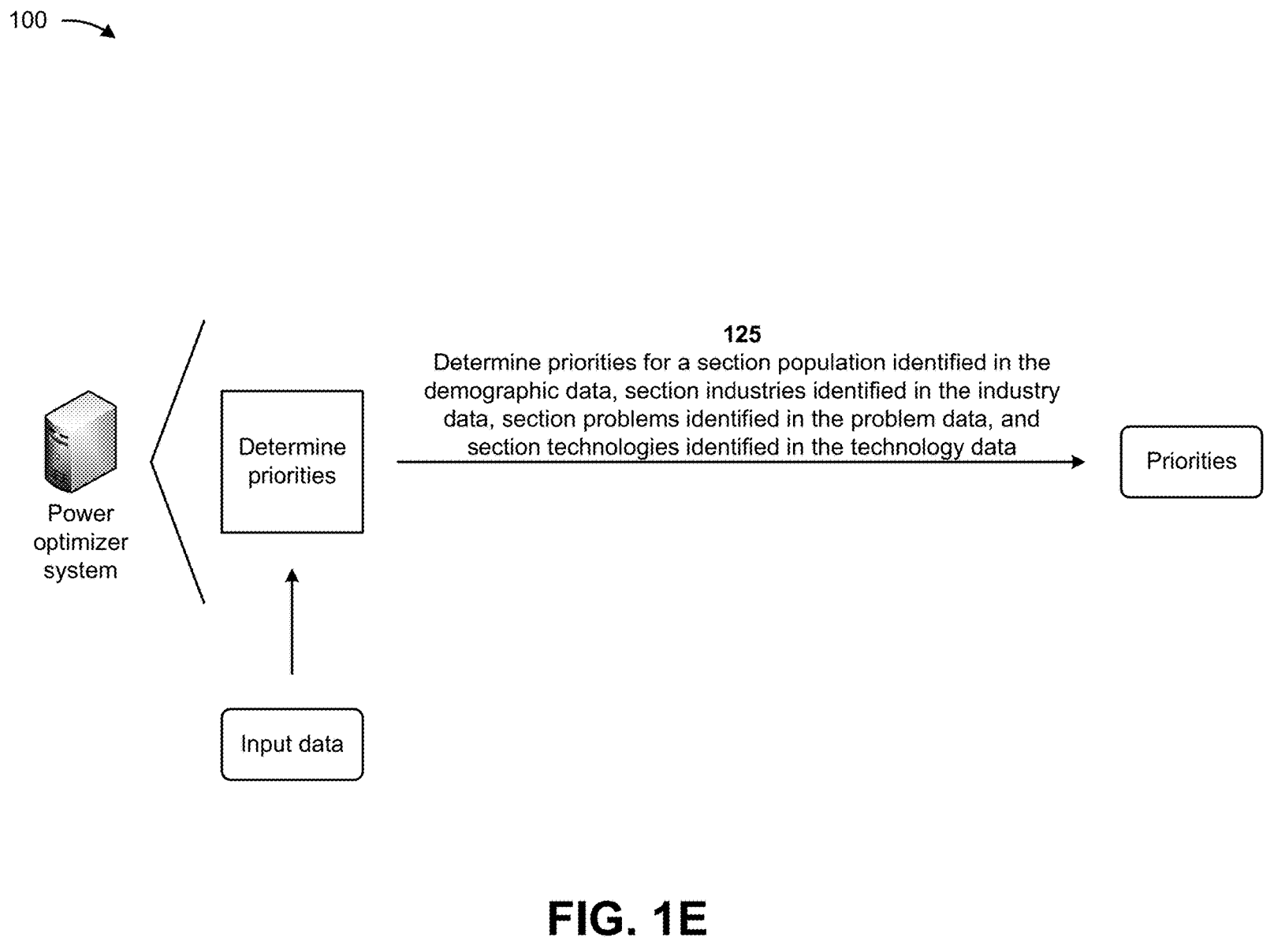

100

Power optimizer system

Determine priorities

Input data

125

Determine priorities for a section population identified in the demographic data, section industries identified in the industry data, section problems identified in the problem data, and section technologies identified in the technology data Priorities

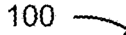

Power optimizer system

140
Perform one or more actions based on the optimized power insights for the section Recommend one or more new power sources for the section Modify parameters of one or more power sources for the section Identify one or more new power routes for the section Identify one or more power consumers to limit in the section Cause an optimized power allocation to be implemented for the section Recommend updates or modifications to one or more power sources for the section

UTILIZING QUANTUM COMPUTING AND A POWER OPTIMIZER MODEL TO DETERMINE OPTIMIZED POWER INSIGHTS FOR A LOCATION

BACKGROUND

Electric power distribution includes providing electricity from a transmission system to individual consumers. Distribution substations connect to the transmission system and lower a transmission voltage with the use of transformers.

SUMMARY

Some implementations described herein relate to a method. The method may include receiving input data that includes demographic data, power demand data, power source data, power route data, technology data, industry data, and problem data associated with a geographic location, and identifying a section of the geographic location from the demographic data. The method may include identifying power sources of the section from the power source data, and estimating power generation and power demand for the section based on the power sources, the power demand data, and the power route data. The method may include determining whether the power demand is greater than the power generation for the section, and utilizing a quantum computer and a power optimizer model with the input data associated with the section to determine optimized power insights for the section based on determining that the power demand is greater than the power generation for the section. The method may include performing one or more actions based on the optimized power insights for the section.

Some implementations described herein relate to a device. The device may include one or more memories and one or more processors coupled to the one or more memories. The one or more processors may be configured to receive input data that includes demographic data, power demand data, power source data, power route data, technology data, industry data, and problem data associated with a geographic location, and identify a section of the geographic location from the demographic data. The one or more processors may be configured to identify power sources of the section from the power source data, and estimate power generation and power demand for the section based on the power sources, the power demand data, and the power route data. The one or more processors may be configured to determine whether the power demand is greater than the power generation for the section. The one or more processors may be configured to selectively identify another section of the geographic location based on determining that the power demand is less than the power generation for the section, or utilize a quantum computer and a power optimizer model with the input data associated with the section to determine optimized power insights for the section based on determining that the power demand is greater than the power generation for the section. The one or more processors may be configured to perform one or more actions based on the optimized power insights for the section.

Some implementations described herein relate to a non-transitory computer-readable medium that stores a set of instructions for a device. The set of instructions, when executed by one or more processors of the device, may cause the device to receive input data that includes demographic data, power demand data, power source data, power route data, technology data, industry data, and problem data associated with a geographic location, and identify a section of the geographic location from the demographic data. The set of instructions, when executed by one or more processors of the device, may cause the device to identify power sources of the section from the power source data, and estimate power generation and power demand for the section based on the power sources, the power demand data, and the power route data. The set of instructions, when executed by one or more processors of the device, may cause the device to determine whether the power demand is greater than the power generation for the section, and determine priorities for a section population identified in the demographic data, section industries identified in the industry data, section problems identified in the problem data, and section technologies identified in the technology data. The set of instructions, when executed by one or more processors of the device, may cause the device to utilize a quantum computer and a power optimizer model with the input data and the priorities associated with the section to determine optimized power insights for the section based on determining that the power demand is greater than the power generation for the section, and perform one or more actions based on the optimized power insights for the section.

BRIEF DESCRIPTION OF THE DRAWINGS

FIGS. 1A-1I are diagrams of an example implementation described herein.

DETAILED DESCRIPTION

Figure 1A:
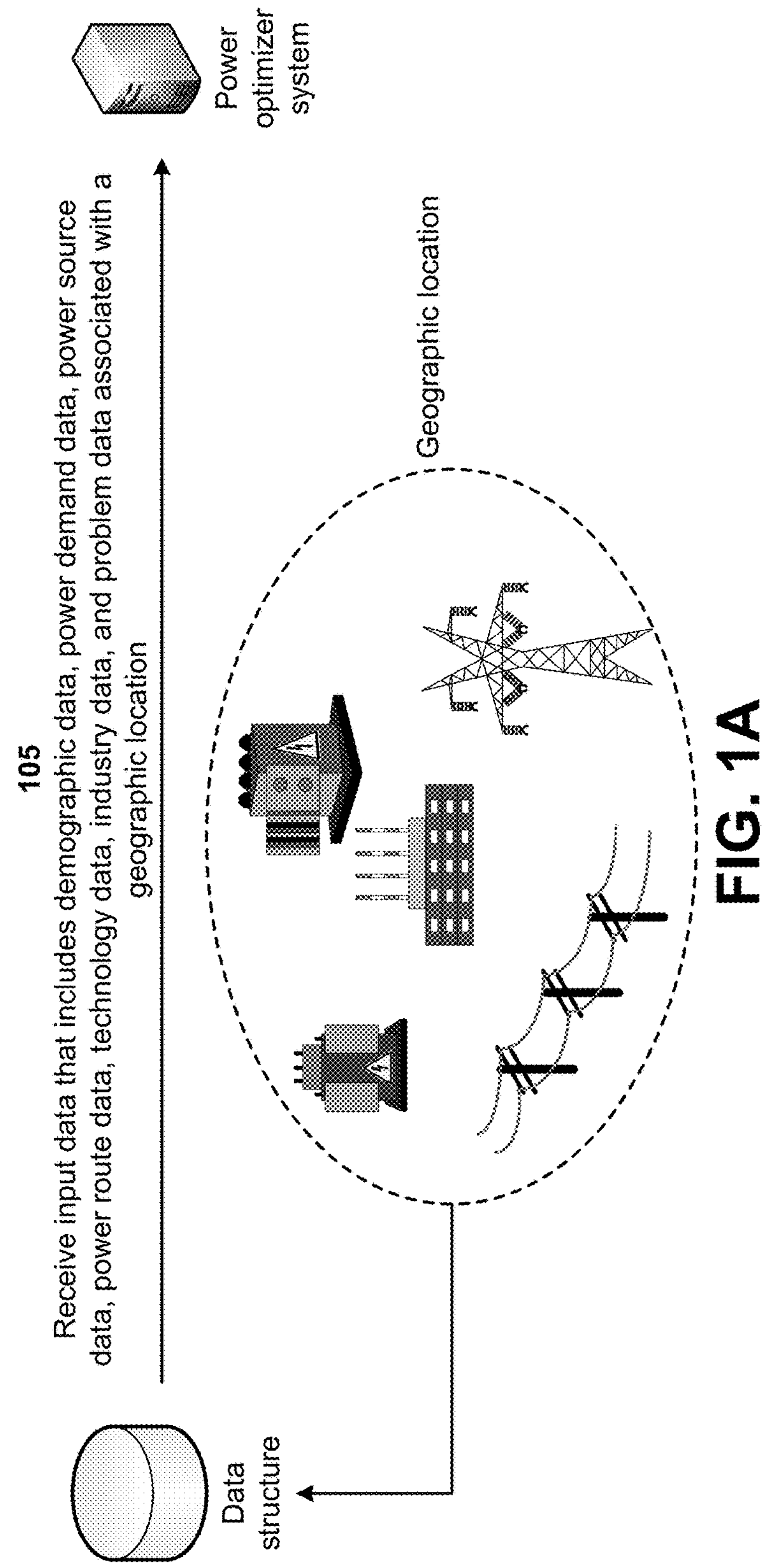

The following detailed description of example implementations refers to the accompanying drawings. The same reference numbers in different drawings may identify the same or similar elements.

Millions of people have limited or no access to electrical power. Increasing affordable power access is also a challenge for people living in extreme poverty. Such people lack reliable access to electrical power and/or basic thermal power services for cooking. Despite making remarkable progress in electrical power distribution over the years, many countries still face challenges associated with meeting growing demands for power and providing reliable power supplies. Therefore, current techniques for providing power distribution for locations consume computing resources (e.g., processing resources, memory resources, communication resources, and/or the like), networking resources, and/or the like associated with providing unplanned and haphazard power distribution at locations, failing to meet power demands of locations, underutilizing power sources in locations, overutilizing power sources in locations, calculating inaccurate power supply and power demand needs, and/or the like.

Some implementations described herein relate to a power optimizer system that utilizes quantum computing and a power optimizer model to determine optimized power insights for a location. For example, the power optimizer system may receive input data that includes demographic data, power demand data, power source data, power route data, technology data, industry data, and problem data associated with a geographic location, and may identify a section of the geographic location from the demographic data. The power optimizer system may identify power sources of the section from the power source data, and may estimate power generation and power demand for the section based on the power sources, the power demand data, and the power route data. The power optimizer system may determine whether the power demand is greater than the power generation for the section. The power optimizer system may utilize a quantum computer and a power optimizer model with the input data associated with the section to determine optimized power insights for the section based on determining that the power demand is greater than the power generation for the section, and may perform one or more actions based on the optimized power insights for the section.

In this way, the power optimizer system utilizes quantum computing and a power optimizer model to determine optimized power insights for a location. The power optimizer system may receive input data that includes demographic data, power demand data, power source data, power route data, technology data, industry data, and problem data associated with a geographic location. The power optimizer system may utilize a quantum computer to process the input data with the power optimizer model to determine optimized power allocations for the geographic location, and may cause the optimized power allocations to be implemented in the geographic location. This, in turn, conserves computing resources, networking resources, and/or the like that would otherwise have been consumed in providing unplanned and haphazard power distribution at locations, failing to meet power demands of locations, underutilizing power sources in locations, overutilizing power sources in locations, calculating inaccurate power supply and power demand needs, and/or the like.

FIGS. 1A-1I are diagrams of an example 100 associated with utilizing quantum computing and a power optimizer model to determine optimized power insights for a location. As shown in FIGS. 1A-1I, example 100 includes a power optimizer system associated with a data structure (e.g., a database, a table, a list, and/or the like). The power optimizer system may include a system that utilizes quantum computing and a power optimizer model to determine optimized power insights for a location (e.g., a geographic location as shown in FIG. 1A). Further details of the power optimizer system and the data structure are provided elsewhere herein.

As shown in FIG. 1A, and by reference number 105, the power optimizer system may receive input data that includes demographic data, power demand data, power source data, power route data, technology data, industry data, and problem data, among other examples, associated with a geographic location. For example, a geographic location may include a country, a state, a county, a city, a town, a neighborhood, and/or the like that includes a population of people. The geographic location may include power sources that generate power (e.g., electricity) for the geographic location, power consumers that consume the power generated by the power sources, power routes that transmit the power from the power sources to the power consumers, and/or the like. The geographic location may be associated with the demographic data, the power demand data, the power source data, the power route data, the technology data, the industry data, and/or the problem data, among other examples.

The demographic data may include data identifying a population of the geographic location, sections (e.g., states, counties, cities, towns, neighborhoods, and/or the like) of the geographic location, populations of the sections, and/or the like. The power demand data may include data identifying power demands by power consumers of the sections of the geographic location. The power source data may include data identifying nuclear power sources, coal power sources, gas power sources, fuel power sources, hydroelectric power sources, solar power sources, wind power sources, and/or the like associated with the geographic location. The power route data may include data identifying power routes (e.g., power transmission lines) through sections of the geographic location. The technology data may include data identifying power consumers (e.g., Internet of Things (IoT) devices, base stations, electric vehicles, houses, and/or the like) associated with the geographic location. The industry data may include data identifying healthcare, automotive, manufacturing, aviation, defense, oil, gas, telecommunications, media, railways, and/or the like associated with the geographic location. The problem data may include data identifying a new roll out, a planned power outage, a power over production, a power line disruption, a power transmission loss, an unregulated power supply, a power wastage, a power shortage, an unplanned power outage, a manmade disaster, a natural disaster, and/or the like associated with the geographic location.

The demographic data, the power demand data, the power source data, the power route data, the technology data, the industry data, and/or the problem data, among other examples, may be continuously stored in the data structure, may be periodically stored in the data structure, may be stored in the data structure based on requests provided by the data structure. In some implementations, the power optimizer system may continuously receive the input data from the data structure, may periodically receive the input data from the data structure, may receive the input data from the data structure based on providing a request for the input data to the data structure, and/or the like.

Figure 1B:
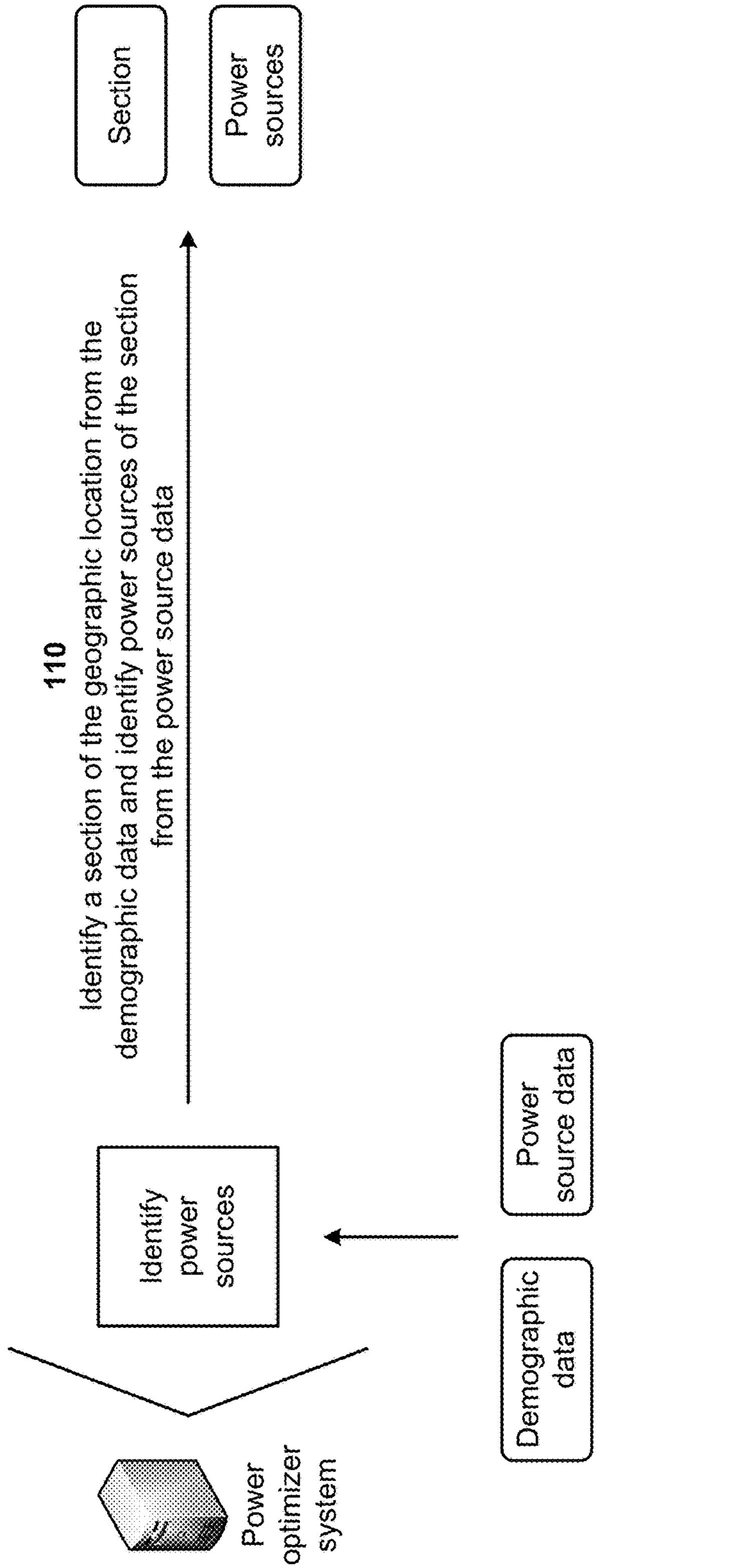

As shown in FIG. 1B, and by reference number 110, the power optimizer system may identify a section of the geographic location from the demographic data and may identify power sources of the section from the power source data. For example, the power optimizer system may divide the geographic location into sections based on the demographic data. Each section of the geographic location may include a threshold population of people that are consumers of power, may be a neighborhood of a city, may be a city of a state, may be a state of a country, and/or the like. In some implementations, the power optimizer system may select or identify a section from the sections of the geographic location. For example, the power optimizer system may identify a neighborhood of a city as the section of the geographic location. In some implementations, the power optimizer system may analyze the power source data associated with the section to identify the power sources of the section.

In some implementations, the power optimizer system may process thousands, millions, and/or the like input data points from tens, hundreds, thousands, and/or the like geographic locations, and the geographic locations may include hundreds, thousands, and/or the like sections. Thus, the processing described herein with respect to a single section may be applied by the power optimizer system to hundreds, thousands, ten thousands, and/or the like sections of multiple geographic locations.

Figure 1C:
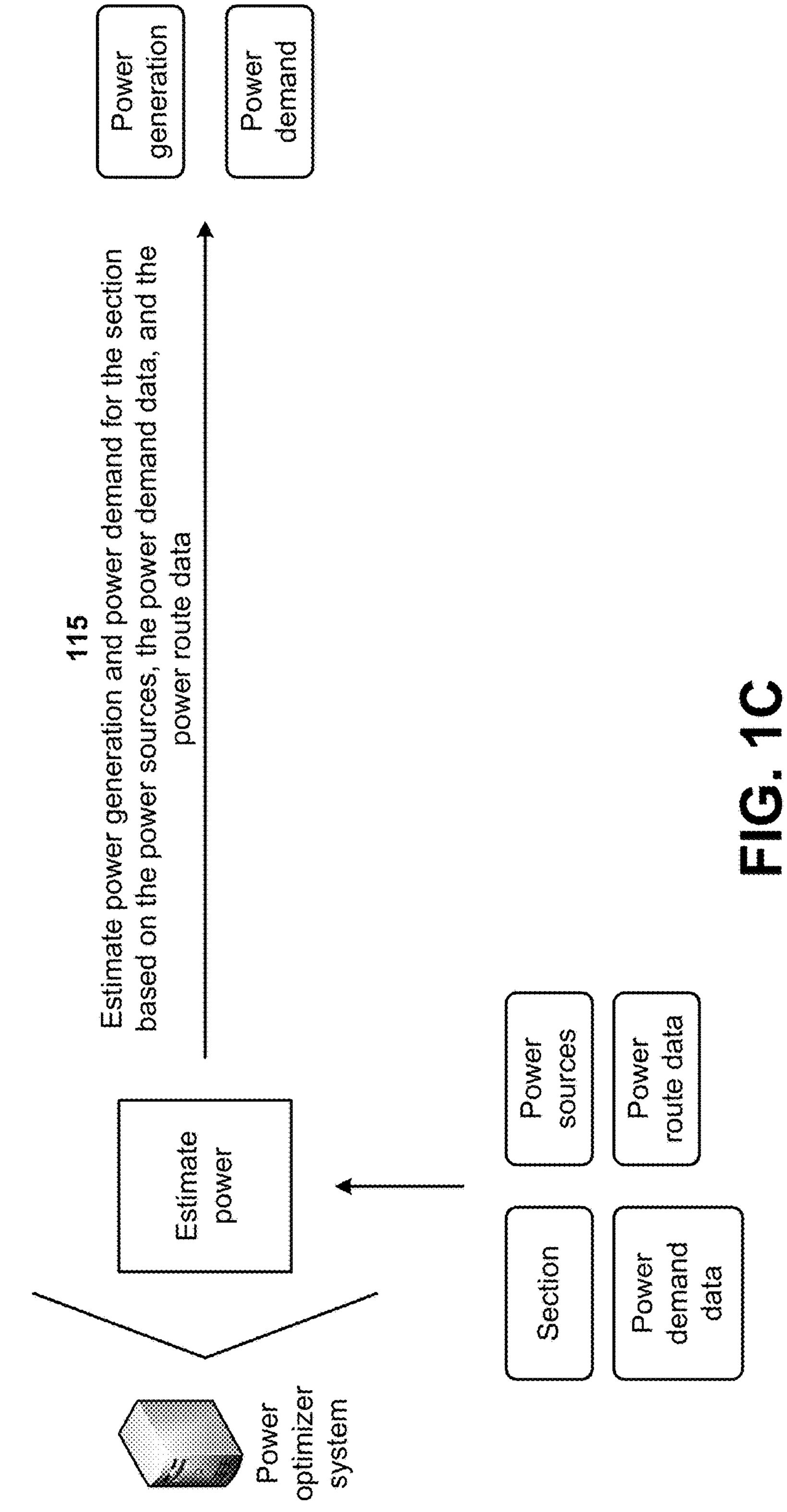

As shown in FIG. 1C, and by reference number 115, the power optimizer system may estimate power generation and power demand for the section based on the power sources, the power demand data, and the power route data. For example, the power optimizer system may estimate the power generation by the power sources for the section, in real time or near-real time, based on power outputs of the power sources for the section. The power optimizer system may identify the power consumers of the section based on the power demand data, and may estimate the power demand for the section, in real time or near-real time, based on power consumptions by the power consumers of the section. In some implementations, the power optimizer system may determine distances between the power sources for the section and the power consumers of the section based on the power route data for the section. For example, the power optimizer system may determine that the power route data for the section includes data indicating that a power consumer of the section may connect with a power source for the section via three routes. The power optimizer system may determine distances for each of the three routes (e.g., ten meters for a first route, twenty meters for a second route, and fifteen meters for a third route).

Figure 1D:
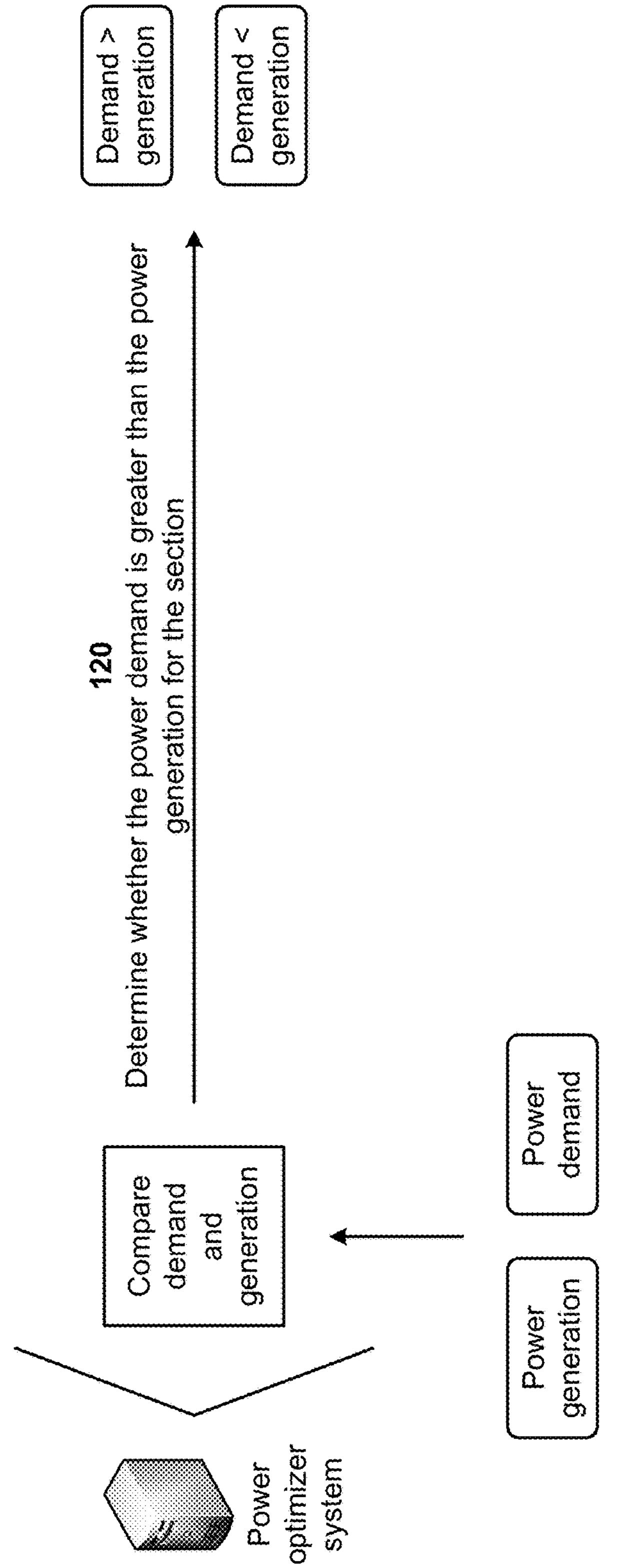

As shown in FIG. 1D, and by reference number 120, the power optimizer system may determine whether the power demand is greater than the power generation for the section based on a population, industries, problems, and technologies of the section. For example, the power optimizer system may compare the power demand for the section and the power generation for the section in real time or near-real time. The power optimizer system may determine whether the power demand for the section is greater than the power generation for the section based on comparing the power demand and the power generation for the section. In some implementations, the power optimizer system may determine that the power demand for the section is greater than the power generation for the section. Alternatively, the power optimizer system may determine that the power demand for the section is not greater than the power generation for the section.

As shown in FIG. 1E, and by reference number 125, the power optimizer system may determine priorities for a section population identified in the demographic data, section industries identified in the industry data, section problems identified in the problem data, and section technologies identified in the technology data. For example, the power optimizer system may assign a first priority to the section population identified in the demographic data, may assign a second priority to the section industries identified in the industry data, may assign a third priority to the section problems identified in the problem data, and may assign a fourth priority to the section technologies identified in the technology data. In some implementations, the power optimizer system may assign further priorities to different section industries, different section problems, different section technologies, and/or the like. For example, the power optimizer system may prioritize the section population higher than other priorities when the section population satisfies a threshold population size indicating that the section population warrants a higher priority than section industries, different section problems, different section technologies, and/or the like. The power optimizer system may prioritize the section industries higher than other priorities when the section industries are determined to be of critical importance for the section.

The priorities may be utilized by a power optimizer model of the power optimizer system when determining optimized power insights for the section, as described below. In some implementations, the power optimizer system may assign a greatest priority to the section problems when the section problems are associated with a manmade disaster or a natural disaster to ensure that power is provided to emergency services handling the manmade disaster or the natural disaster. In some implementations, the power optimizer may assign a greatest priority to one of the section industries when the section industry (e.g., a transportation industry) is required for the section to function properly, one of the section problems when the section problem requires immediate attention, one of the section technologies when the section technology (e.g., autonomous vehicles) require power for safety purposes, and/or the like.

Figure 1F:
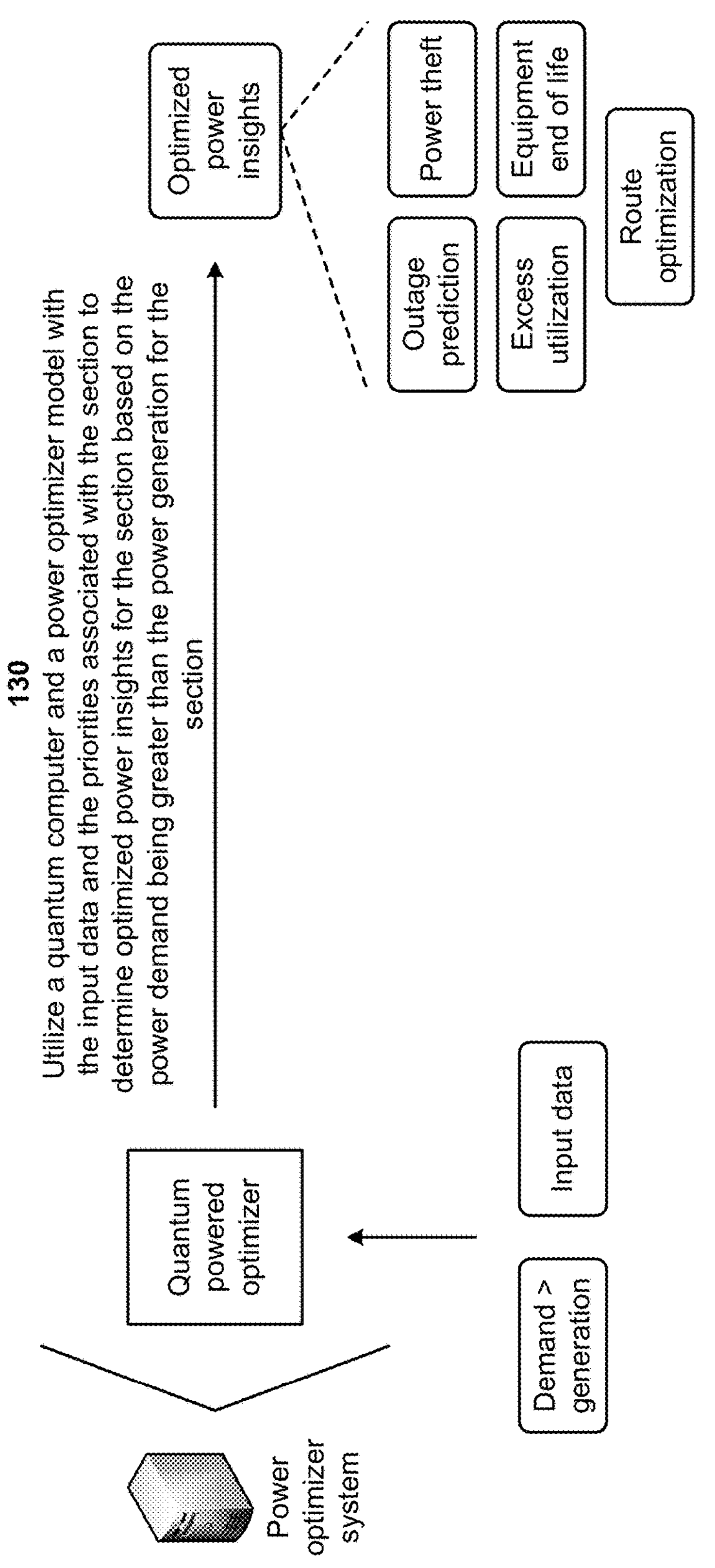

As shown in FIG. 1F, and by reference number 130, the power optimizer system may utilize a quantum computer and a power optimizer model with the input data and the priorities associated with the section to determine optimized power insights for the section based on the power demand being greater than the power generation for the section. For example, optimization, in real time, of millions of power routes necessitates a significant degree of compute power. The power optimizer model may consider different combinations of the input data resulting in processing of millions, trillions, and/or the like data points, which warrants utilization of a quantum computer. For example, quantum computing is needed since power optimization of hundreds, thousands, and/or the like of power sources in a geographical location requires processing of trillions of different combinations of the input data. Quantum computing is also needed since power optimization in real time of millions of power routes necessitates a significant degree of compute power. A conventional computer is unable to perform such computations in real time or near real time. The power optimizer system may utilize the quantum computer and the power optimizer model to perform calculations in real time. When the power demand is greater than the power generation for the section, the power optimizer system may utilize the quantum computer and the power optimizer model, with the input data and the priorities associated with the section, to determine the optimized power insights for the section.

In some implementations, the power optimizer model may assign routes (e.g., r=1, . . . , R) to industries (e.g., i=1, . . . , I) using a binary variable $q_{r,i}(0, 1)$ and constraints (e.g., j(r, i) and k(r, i)) as functions of the routes r and the industry i. The power optimizer model may define a matrix for the constraints j(r, i), k(r, i+1)=a or zero. Since particular industries I(i) require a particular quantity of power E(r) available from each route r, the power optimizer model may utilize a function F(n) to specify the quantity of routes that each industry requires to receive power in an optimized way, and may utilize another function G(r, i) to define a preference for a route r for a particular industry i. The other function may be G(r, i)=h1(r)h2(i), where h1(r)={4 or highly critical, 3 or critical, 2 or medium, 1 or low} and h2(i) ={industry 1, industry 2, industry 3}. The power optimizer model may calculate a power optimized route (q), as follows:

$$\sum_{r,r'}^{R}\sum_{i,i'}^{I} Jj(r,i), k(r',i')qj(r,i)qk(r',i') + \lambda\sum_{i}^{I}\left(\sum_{r}^{R} E(r)qj(r,i) - I(i)\right)^2 + \gamma\sum_{r}^{R}\left(\sum_{i}^{I} h1(r)h2(i)qj(r,i) - F(n)\right)^2,$$

where $\lambda$ and $\gamma$ are variables. Thus, the power optimizer model may calculate the power optimized route (q) based on a sum of the constraints, the particular quantity of power available from each route r, and the preference for a route r for a particular industry i.

For example, if r=3 (r1, r2, and r3) and I=4 (I1, I2, I3, and I4), the power optimizer model may optimize three routes for four industries at given instance. If $\lambda$=0.3, $\gamma$=1.3, h1(r)=1, h2(i)=1, E(r)=1, and I(i)=1, the power optimizer model may optimize and prioritize the first route (r1) for the first industry (I1), may optimize and prioritize the second route (r2) for the second industry (I2) and the fourth industry (I4), and may optimize and prioritize the third route (r3) for the third industry (I3). In some implementations, there may thousands, ten thousands, and/or the like of power routes, and the power optimizer model may optimize the power routes for different industries, populations, technologies, and/or the like in real time or near-real time with quantum computing.

In some implementations, when utilizing the quantum computer and the power optimizer model with the input data and the priorities associated with the section to determine the optimized power insights for the section, the power optimizer system may identify current power routes in the section based on the power route data, and may define a quantity of the current power routes for each industry in the section based on the industry data. The power optimizer system may assign the quantity of the current power routes to each of the industries in the section, and may calculate an optimized power to provide to each of the quantity of the current power routes. The power optimizer system may determine the optimized power insights for the section based on calculating the optimized power to provide to each of the quantity of the current power routes.

In some implementations, the optimized power insights may include an outage prediction associated with the section, a power theft identification for the section, an overutilization of power in the section, an underutilization of power in the section, an identification of power equipment end of life in the section, a power demand versus power supply correlation for the section, a power requirements forecast for the section, a disaster recovery requirement for the section, a renewable power site identification for the section, and/or the like.

Figure 1G:
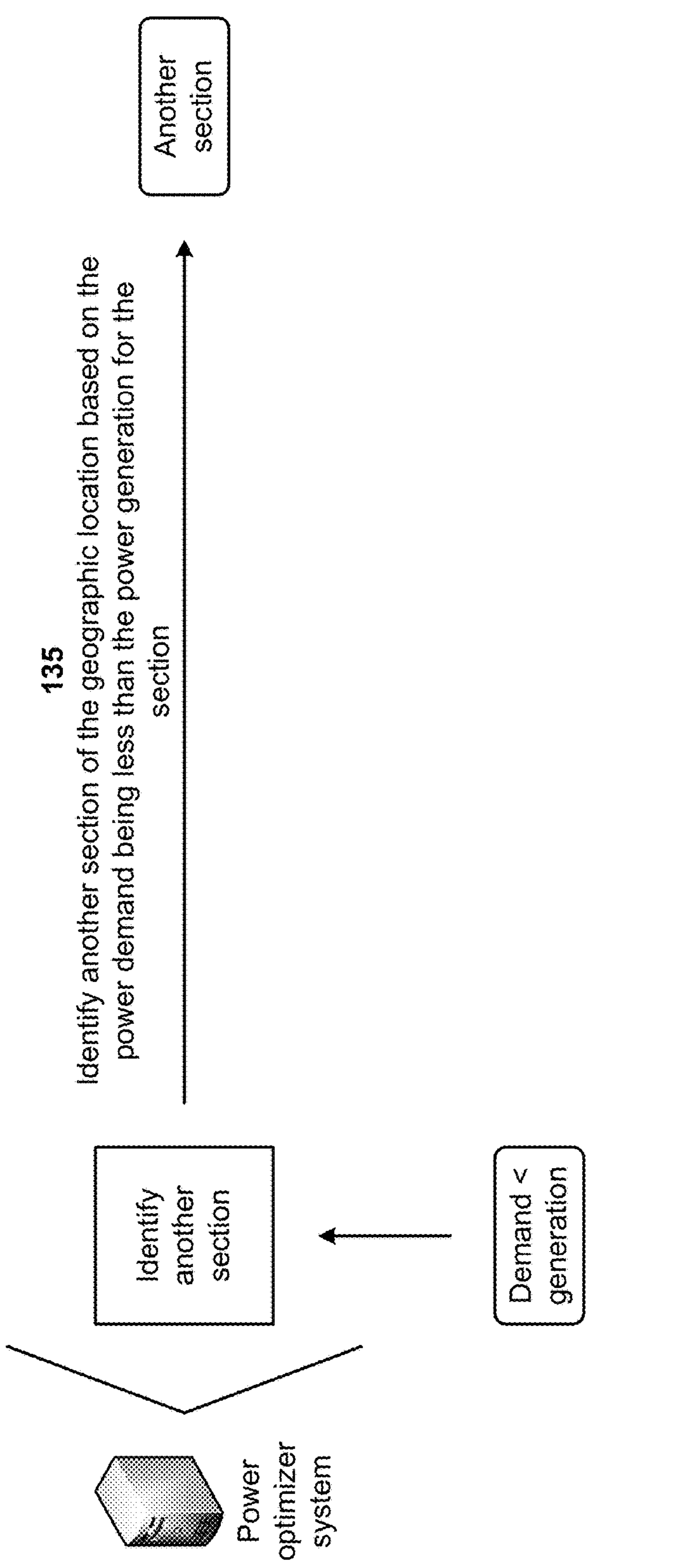

As shown in FIG. 1G, and by reference number 135, the power optimizer system may identify another section of the geographic location based on the power demand being less than the power generation for the section. For example, when the power optimizer system determines that the power demand for the section is not greater than (e.g., is less than) the power generation for the section, the power optimizer system may not utilize the quantum computer and the power optimizer model with the input data and the priorities associated with the section to determine the optimized power insights. Rather, the power optimizer system may identify another section of the geographic location and may perform the functionality, described above in connection with one or more of FIGS. 1B-1F, for the other section.

As shown in FIG. 1H, and by reference number 140, the power optimizer system may perform one or more actions based on the optimized power insights for the section. In some implementations, performing the one or more actions includes the power optimizer system recommending one or more new power sources for the section. For example, the optimized power insights may indicate that the section requires a new power source so that the power demand is less than the power generation for the section. The power optimizer system may generate a recommendation that the new power source be provided for the section, and may provide the recommendation for display, may cause a backup power source to be utilized, may cause power to be diverted from another power source, and/or the like. In this way, the power optimizer system conserves computing resources, networking resources, and/or the like that would otherwise have been consumed in providing unplanned and haphazard power distribution at locations.

In some implementations, performing the one or more actions includes the power optimizer system modifying parameters of one or more power sources for the section. For example, the optimized power insights may indicate that increasing power from a power source of the section will cause the power demand to be less than the power generation for the section. The power optimizer system may determine that modifying parameters of the power source will increase the power generated by the power source. The power optimizer system may cause the power source to modify the parameters accordingly and, thus, increase the power generated by the power source. In this way, the power optimizer system conserves computing resources, networking resources, and/or the like that would otherwise have been consumed in failing to meet power demands of locations.

In some implementations, performing the one or more actions includes the power optimizer system identifying one or more new power routes for the section. For example, the optimized power insights may indicate that adding a new power route for the section will cause the power demand to be less than the power generation for the section. The power optimizer system may generate a recommendation that the new power route be provided for the section, may provide the recommendation for display, may schedule a team to create the new power route, may automatically generate a simulation that includes the new power route so that a technician could determine if the new power route is correct, may cause power sources to route power in a new way to create the new power route. In this way, the power optimizer system conserves computing resources, networking resources, and/or the like that would otherwise have been consumed in underutilizing power sources in locations.

In some implementations, performing the one or more actions includes the power optimizer system identifying one or more power consumers to limit in the section. For example, the optimized power insights may indicate that limiting power consumption by a power consumer of the section will cause the power demand to be less than the power generation for the section. The power optimizer system may generate a recommendation that the power consumption by the power consumer of the section be limited, may provide the recommendation for display, may cause less power to be provided to the power consumer, may provide a notification to the power consumer to stop using so much power or that their power will be throttled, and/or the like. In this way, the power optimizer system conserves computing resources, networking resources, and/or the like that would otherwise have been consumed in underutilizing power sources in locations.

In some implementations, performing the one or more actions includes the power optimizer system causing an optimized power allocation to be implemented for the section. For example, the optimized power insights may indicate that an optimized power allocation determined by the power optimizer model will cause the power demand to be less than the power generation for the section. The power optimizer system may instruct the power sources to utilize the power routes of the section in a particular manner that causes the optimized power allocation for the section. In this way, the power optimizer system conserves computing resources, networking resources, and/or the like that would otherwise have been consumed in providing unplanned and haphazard power distribution at locations.

In some implementations, performing the one or more actions includes the power optimizer system recommending updates or modifications to one or more power sources for the section. For example, the optimized power insights may indicate that updating a power source of the section (e.g., to increase a power output) will cause the power demand to be less than the power generation for the section. The power optimizer system may generate a recommendation that the power source be updated, may provide the recommendation for display, may schedule a technician to update or service the power source, may instruct the power source to output more power, and/or the like. In this way, the power optimizer system conserves computing resources, networking resources, and/or the like that would otherwise have been consumed in failing to meet power demands of locations.

In this way, the power optimizer system utilizes quantum computing and a power optimizer model to determine optimized power insights for a location. The power optimizer system may receive input data that includes demographic data, power demand data, power source data, power route data, technology data, industry data, and problem data, among other examples, associated with a geographic location. The power optimizer system may utilize a quantum computer to process the input data with the optimizer model to determine optimized power allocations for the geographic location, and may cause the optimized power allocations to be implemented in the geographic location. This, in turn, conserves computing resources, networking resources, and/or the like that would otherwise have been consumed in providing unplanned and haphazard power distribution at locations, failing to meet power demands of locations, underutilizing power sources in locations, overutilizing power sources in locations, calculating inaccurate power supply and power demand needs, and/or the like.

Figure 1I:
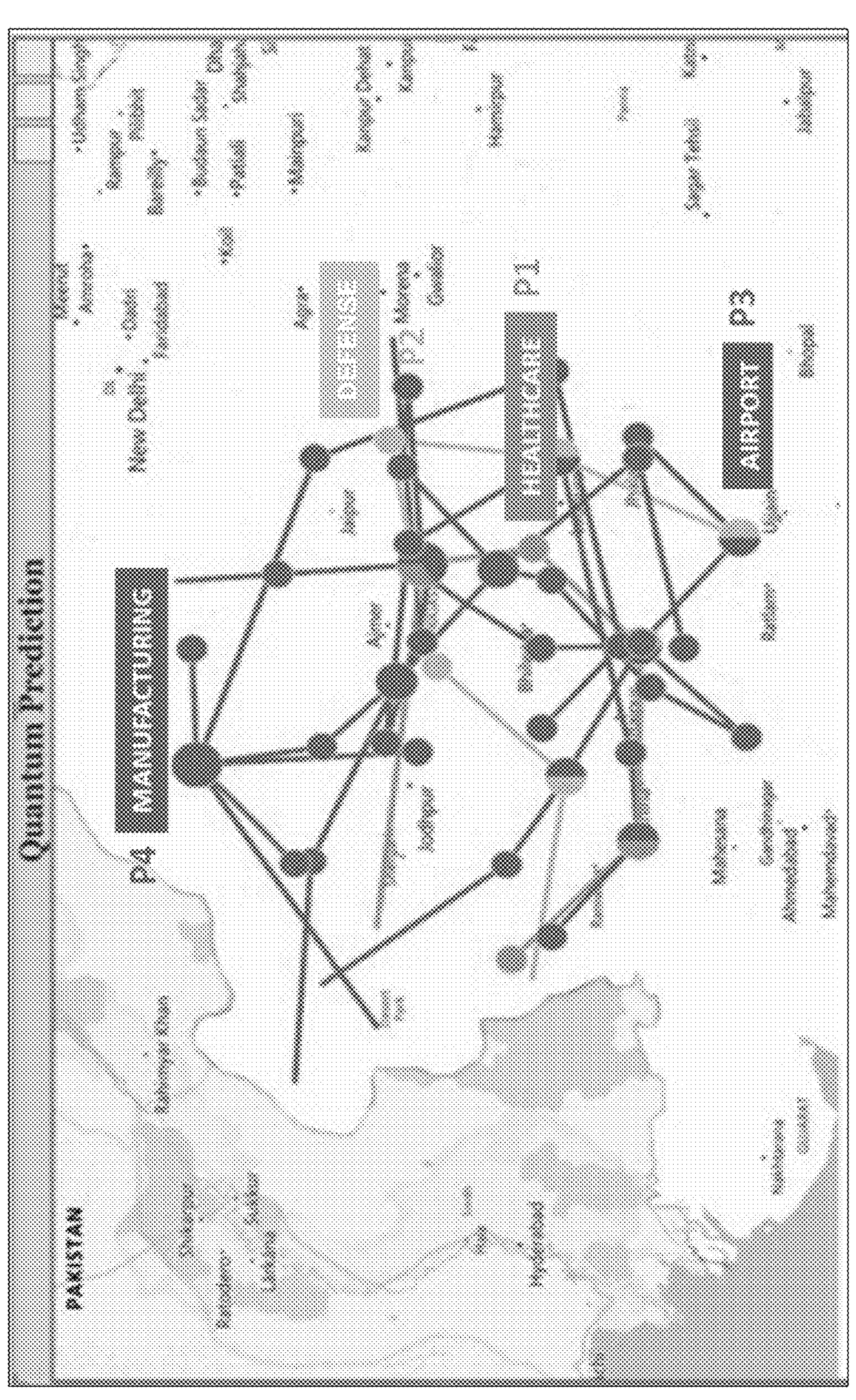

FIG. 1I depicts an example user interface capable of being generated by the power optimizer system. As shown, the user interface may include indications of optimized power routes for different industries (e.g., a manufacturing industry, a defense industry, a healthcare industry, an airport or transportation industry, and/or the like) in a geographic location.

As indicated above, FIGS. 1A-1I are provided as an example. Other examples may differ from what is described with regard to FIGS. 1A-1I. The number and arrangement of devices shown in FIGS. 1A-1I are provided as an example. In practice, there may be additional devices, fewer devices, different devices, or differently arranged devices than those shown in FIGS. 1A-1I. Furthermore, two or more devices shown in FIGS. 1A-1I may be implemented within a single device, or a single device shown in FIGS. 1A-1I may be implemented as multiple, distributed devices. Additionally, or alternatively, a set of devices (e.g., one or more devices) shown in FIGS. 1A-1I may perform one or more functions described as being performed by another set of devices shown in FIGS. 1A-1I.

Figure 2:
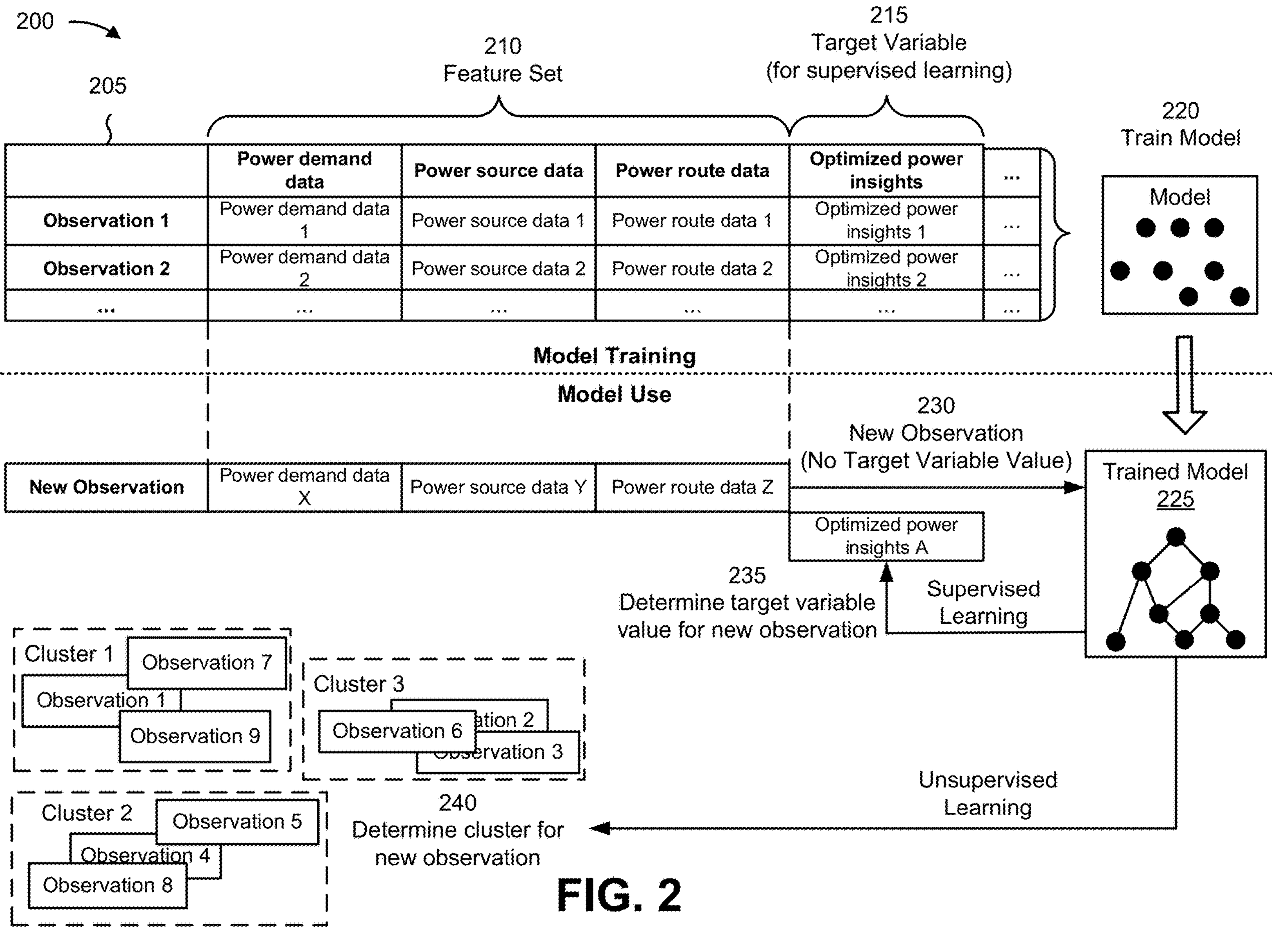
FIG. 2 is a diagram illustrating an example of training and using a machine learning model.

FIG. 2 is a diagram illustrating an example 200 of training and using a machine learning model for determining optimized power insights for a location. The machine learning model training and usage described herein may be performed using a machine learning system. The machine learning system may include or may be included in a computing device, a server, a cloud computing environment, and/or the like, such as the power optimizer system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the power optimizer system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the migration system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of power demand data, a second feature of power source data, a third feature of power route data, and so on. As shown, for a first observation, the first feature may have a value of power demand data 1, the second feature may have a value of power source data 1, the third feature may have a value of power route data 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable may be labelled optimized power insights and may include a value of optimized power insights 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of power demand data X, a second feature of power source data Y, a third feature of power route data Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of optimized power insights A for the target variable of the optimized power insights for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a power demand data cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a power source data cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to determine optimized power insights for a location. The machine learning system enables recognition and/or identification of tens, hundreds, thousands, or millions of features and/or feature values for tens, hundreds, thousands, or millions of observations, thereby increasing accuracy and consistency and reducing delay associated with determining optimized power insights for a location relative to requiring computing resources to be allocated for tens, hundreds, or thousands of operators to manually determine optimized power insights for a location.

As indicated above, FIG. 2 is provided as an example. Other examples may differ from what is described in connection with FIG. 2.

Figure 3:
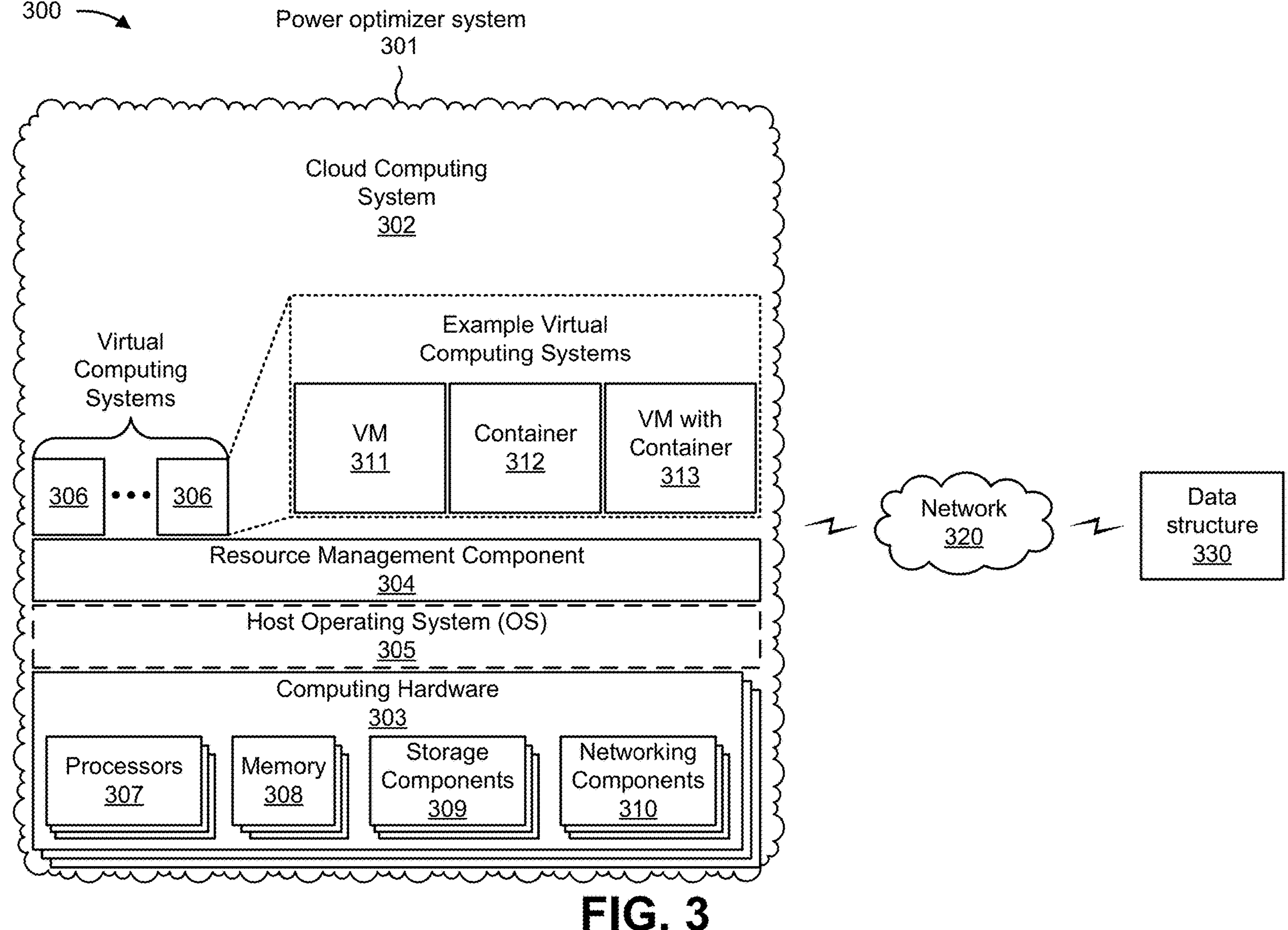
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include a power optimizer system 301, which may include one or more elements of and/or may execute within a cloud computing system 302. The cloud computing system 302 may include one or more elements 303-313, as described in more detail below. As further shown in FIG. 3, the environment 300 may include a network 320 and/or a data structure 330. Devices and/or elements of the environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of the computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing the computing hardware 303 to start, stop, and/or manage the one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the power optimizer system 301 may include one or more elements 303-313 of the cloud computing system 302, may execute within the cloud computing system 302, and/or may be hosted within the cloud computing system 302, in some implementations, the power optimizer system 301 may not be cloud-based (e.g., may be implemented outside of a cloud computing system) or may be partially cloud-based. For example, the power optimizer system 301 may include one or more devices that are not part of the cloud computing system 302, such as device 400 of FIG. 4, which may include a standalone server or another type of computing device. The power optimizer system 301 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or the like, and/or a combination of these or other types of networks. The network 320 enables communication among the devices of the environment 300.

The data structure 330 may include one or more devices capable of receiving, generating, storing, processing, and/or providing information, as described elsewhere herein. The data structure 330 may include a communication device and/or a computing device. For example, the data structure 330 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data structure 330 may communicate with one or more other devices of the environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
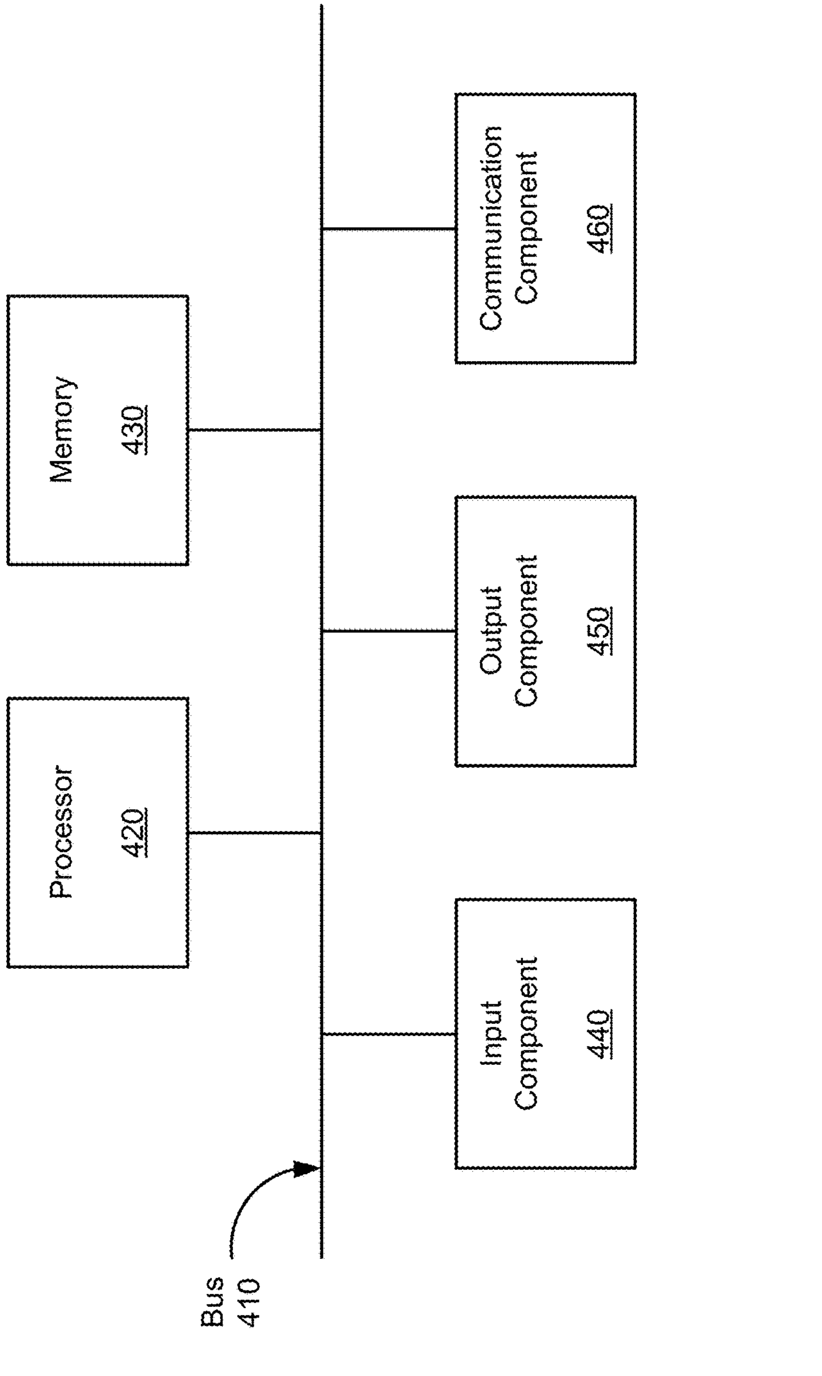
FIG. 4 is a diagram of example components of one or more devices of FIG. 3.

FIG. 4 is a diagram of example components of a device 400, which may correspond to the power optimizer system 301 and/or the data structure 330. In some implementations, the power optimizer system 301 and/or the data structure 330 may include one or more devices 400 and/or one or more components of the device 400. As shown in FIG. 4, the device 400 may include a bus 410, a processor 420, a memory 430, an input component 440, an output component 450, and a communication component 460.

The bus 410 includes a component that enables wired and/or wireless communication among the components of device 400. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform a function. The memory 430 includes a random-access memory, a read only memory, and/or another type of memory (e.g., a flash memory, a magnetic memory, and/or an optical memory).

The input component 440 enables the device 400 to receive input, such as user input and/or sensed inputs. For example, the input component 440 may include a touch screen, a keyboard, a keypad, a mouse, a button, a microphone, a switch, a sensor, a global positioning system component, an accelerometer, a gyroscope, an actuator, and/or the like. The output component 450 enables the device 400 to provide output, such as via a display, a speaker, and/or one or more light-emitting diodes. The communication component 460 enables the device 400 to communicate with other devices, such as via a wired connection and/or a wireless connection. For example, the communication component 460 may include a receiver, a transmitter, a transceiver, a modem, a network interface card, an antenna, and/or the like.

The device 400 may perform one or more processes described herein. For example, a non-transitory computer-readable medium (e.g., the memory 430) may store a set of instructions (e.g., one or more instructions, code, software code, program code, and/or the like) for execution by the processor 420. The processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
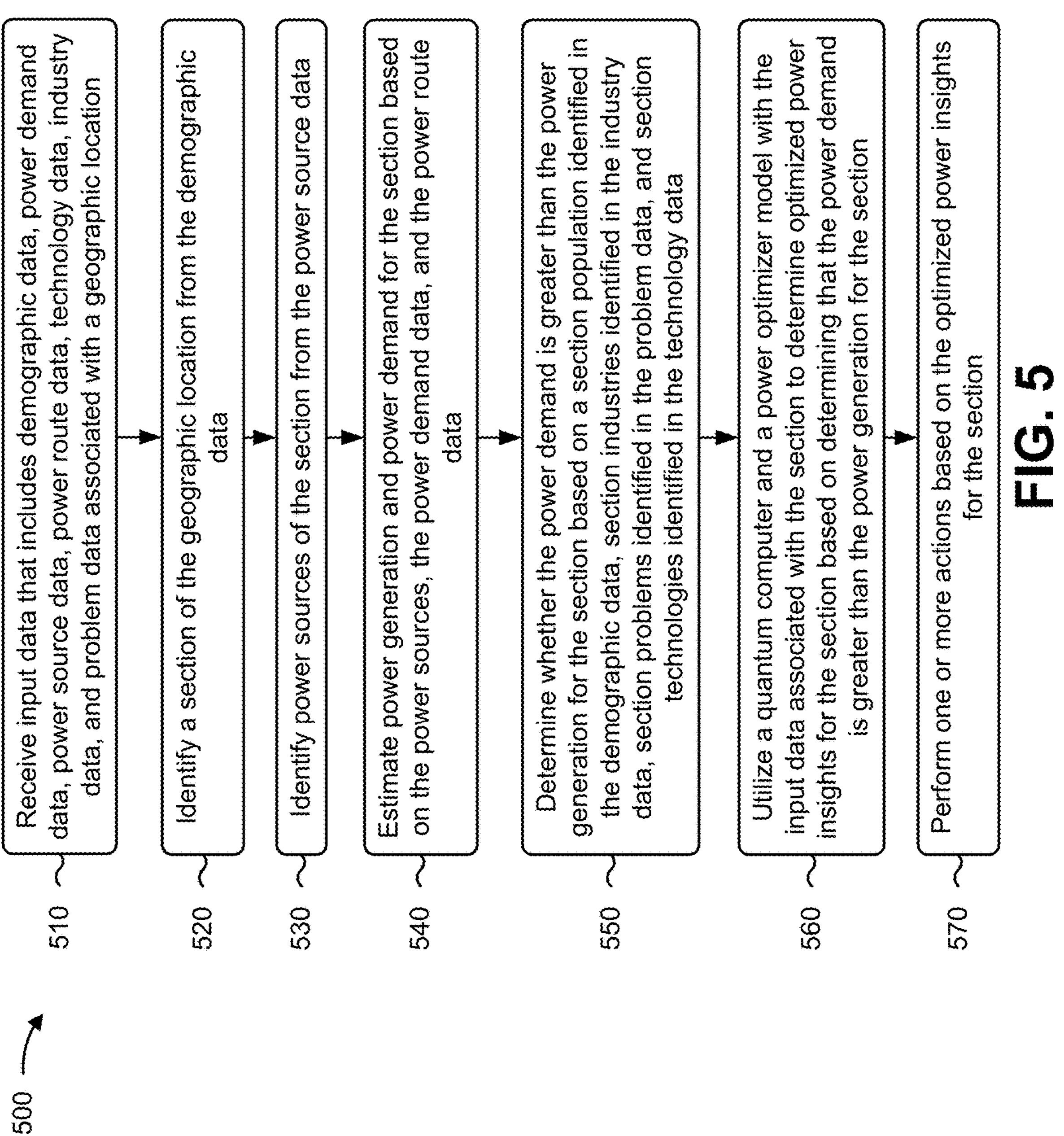
FIG. 5 is a flowchart of an example process for utilizing quantum computing and a power optimizer model to determine optimized power insights for a location.

FIG. 5 is a flowchart of an example process 500 for utilizing quantum computing and a power optimizer model to determine optimized power insights for a location. In some implementations, one or more process blocks of FIG. 5 may be performed by a device (e.g., the power optimizer system 301). In some implementations, one or more process blocks of FIG. 5 may be performed by another device or a group of devices separate from or including the device.

Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving input data that includes demographic data, power demand data, power source data, power route data, technology data, industry data, and problem data associated with a geographic location (block 510). For example, the device may receive input data that includes demographic data, power demand data, power source data, power route data, technology data, industry data, and problem data associated with a geographic location, as described above.

In some implementations, the demographic data includes data identifying a population of the geographic location, sections of the geographic location and including the section, and populations of the sections, and the power demand data includes data identifying power demands of the sections of the geographic location. In some implementations, the power source data includes data identifying one or more of a nuclear power source, a coal power source, a gas power source, a fuel power source, a hydroelectric power source, a solar power source, or a wind power source associated with the geographic location, and the power route data includes data identifying power routes through sections of the geographic location. In some implementations, the technology data includes data identifying IoT devices, base stations, and electric vehicles associated with the geographic location, the industry data includes data identifying one or more industries associated with the geographic location, and the problem data includes data identifying one or more of a new roll out, a planned power outage, a power over production, a power line disruption, a power transmission loss, an unregulated power supply, a power wastage, a power shortage, an unplanned power outage, a manmade disaster, or a natural disaster associated with the geographic location.

As further shown in FIG. 5, process 500 may include identifying a section of the geographic location from the demographic data (block 520). For example, the device may identify a section of the geographic location from the demographic data, as described above.

As further shown in FIG. 5, process 500 may include identifying power sources of the section from the power source data (block 530). For example, the device may identify power sources of the section from the power source data, as described above.

As further shown in FIG. 5, process 500 may include estimating power generation and power demand for the section based on the power sources, the power demand data, and the power route data (block 540). For example, the device may estimate power generation and power demand for the section based on the power sources, the power demand data, and the power route data, as described above.

As further shown in FIG. 5, process 500 may include determining whether the power demand is greater than the power generation for the section (block 550). For example, the device may determine whether the power demand is greater than the power generation for the section, as described above.

As further shown in FIG. 5, process 500 may include utilizing a quantum computer and a power optimizer model with the input data associated with the section to determine optimized power insights for the section based on determining that the power demand is greater than the power generation for the section (block 560). For example, the device may utilize a quantum computer and a power optimizer model with the input data associated with the section to determine optimized power insights for the section based on determining that the power demand is greater than the power generation for the section, as described above. In some implementations, utilizing the quantum computer and the power optimizer model with the input data associated with the section to determine the optimized power insights for the section includes identifying current power routes in the section based on the power route data; defining a quantity of the current power routes for each industry in the section based on the industry data; assigning the quantity of the current power routes to each of the industries in the section; calculating an optimized power to provide to each of the quantity of the current power routes; and determining the optimized power insights for the section based on calculating the optimized power to provide to each of the quantity of the current power routes.

In some implementations, the optimized power insights include one or more of an outage prediction associated with the section, a power theft identification for the section, an overutilization of power in the section, an underutilization of power in the section, an identification of power equipment end of life in the section, a power demand versus power supply correlation for the section, a power requirements forecast for the section, a disaster recovery requirement for the section, or a renewable power site identification for the section.

In some implementations, utilizing the quantum computer and the power optimizer model with the input data associated with the section to determine the optimized power insights for the section includes determining priorities for a section population identified in the demographic data, section industries identified in the industry data, section problems identified in the problem data, and section technologies identified in the technology data; and utilizing the quantum computer and the power optimizer model with the priorities associated with the section to determine the optimized power insights for the section. In some implementations, a priority associated with the problems includes a greatest priority when the problems are associated with a manmade disaster or a natural disaster.

As further shown in FIG. 5, process 500 may include performing one or more actions based on the optimized power insights for the section (block 570). For example, the device may perform one or more actions based on the optimized power insights for the section, as described above. In some implementations, performing the one or more actions includes one or more of recommending one or more new power sources for the section, or modifying parameters of one or more power sources for the section. In some implementations, performing the one or more actions includes one or more of identifying one or more new power routes for the section, or identifying one or more power consumers to limit in the section.

In some implementations, performing the one or more actions includes determining an optimized power allocation for the section based on the optimized power insights for the section, and causing the optimized power allocation to be implemented for the section. In some implementations, performing the one or more actions includes generating recommendations identifying updates or modifications to one or more power sources for the section, and providing the recommendations for display.

In some implementations, process 500 includes identifying another section of the geographic location based on determining that the power demand is less than the power generation for the section.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:

receiving, by a device, input data that includes demographic data, power demand data, power source data, power route data, technology data, industry data, and problem data associated with a geographic location;

identifying, by the device, a section of the geographic location from the demographic data;

identifying, by the device, power sources of the section from the power source data;

estimating, by the device, power generation and power demand for the section based on the power sources, the power demand data, and the power route data;

determining, by the device, whether the power demand is greater than the power generation for the section;

utilizing, by the device, a quantum computer and a power optimizer model with the input data associated with the section to determine optimized power insights for the section based on determining that the power demand is greater than the power generation for the section, wherein utilizing the quantum computer and the power optimizer model with the input data associated with the section to determine the optimized power insights for the section comprises:

identifying current power routes in the section based on the power route data;

defining a quantity of the current power routes for each industry in the section based on the industry data;

assigning the quantity of the current power routes to each of the industries in the section;

calculating an optimized power to provide to each of the quantity of the current power routes, wherein calculating the optimized power to provide to each of the quantity of the current power routes in the section comprises:

identifying a power constraint for each quantity of current power routes associated with each of the industry in the section;

identifying a quantity of power available for each quantity of current power routes associated with each of the industry in the section;

identifying a priority for each quantity of current power routes associated with each of the industry in the section; and combining the identified power constraint, quantity of power available and the priority for each quantity of current power routes associated with each of the industry in the section; and determining the optimized power insights for the section based on calculating the optimized power to provide to each of the quantity of the current power routes; and performing, by the device, one or more actions based on the optimized power insights for the section.

2. The method of claim 1, further comprising:

identifying another section of the geographic location based on determining that the power demand is less than the power generation for the section.

3. The method of claim 1, wherein the demographic data includes data identifying a population of the geographic location, sections of the geographic location and including the section, and populations of the sections; and wherein the power demand data includes data identifying power demands of the sections of the geographic location.

4. The method of claim 1, wherein the power source data includes data identifying one or more of a nuclear power source, a coal power source, a gas power source, a fuel power source, a hydroelectric power source, a solar power source, or a wind power source associated with the geographic location; and wherein the power route data includes data identifying power routes through sections of the geographic location.

5. The method of claim 1, wherein the technology data includes data identifying Internet of Things devices, base stations, and electric vehicles associated with the geographic location;

wherein the industry data includes data identifying one or more industries associated with the geographic location; and wherein the problem data includes data identifying one or more of a new roll out, a planned power outage, a power over production, a power line disruption, a power transmission loss, an unregulated power supply, a power wastage, a power shortage, an unplanned power outage, a manmade disaster, or a natural disaster associated with the geographic location.

6. The method of claim 1, wherein the optimized power insights include one or more of:

an outage prediction associated with the section, a power theft identification for the section, an overutilization of power in the section, an underutilization of power in the section, an identification of power equipment end of life in the section, a power demand versus power supply correlation for the section, a power requirements forecast for the section, a disaster recovery requirement for the section, or a renewable power site identification for the section.

7. A device comprising:

one or more memories; and one or more processors, coupled to the one or more memories, configured to:

receive input data that includes demographic data, power demand data, power source data, power route data, technology data, industry data, and problem data associated with a geographic location;

identify a section of the geographic location from the demographic data;

identify power sources of the section from the power source data;

estimate power generation and power demand for the section based on the power sources, the power demand data, and the power route data;

determine whether the power demand is greater than the power generation for the section;

selectively:

identify another section of the geographic location based on determining that the power demand is less than the power generation for the section; or utilize a quantum computer and a power optimizer model with the input data associated with the section to determine optimized power insights for the section based on determining that the power demand is greater than the power generation for the section, wherein to utilize the quantum computer and the power optimizer model with the input data associated with the section to determine the optimized power insights for the section, the one or more processors are configured to:

identify current power routes in the section based on the power route data;

define a quantity of the current power routes for each industry in the section based on the industry data;

assign the quantity of the current power routes to each of the industries in the section;

calculate an optimized power to provide to each of the quantity of the current power routes, wherein the one or more processors, to calculate the optimized power to provide to each of the quantity of the current power routes, are configured to:

identify a power constraint for each quantity of current power routes associated with each of the industry in the section;

identify a quantity of power available for each quantity of current power routes associated with each of the industry in the section;

identify a priority for each quantity of current power routes associated with each of the industry in the section; and combine the identified power constraint, quantity of power available and the priority for each quantity of current power routes associated with each of the industry in the section; and determine the optimized power insights for the section based on calculating the optimized power to provide to each of the quantity of the current power routes; and perform one or more actions based on the optimized power insights for the section.

8. The device of claim 7, wherein the one or more processors, to perform the one or more actions, are configured to one or more of:

recommend one or more new power sources for the section; or modify parameters of one or more power sources for the section.

9. The device of claim 7, wherein the one or more processors, to perform the one or more actions, are configured to one or more of:

identify one or more new power routes for the section; or identify one or more power consumers to limit in the section.

10. The device of claim 7, wherein the one or more processors, to perform the one or more actions, are configured to:

determine an optimized power allocation for the section based on the optimized power insights for the section; and cause the optimized power allocation to be implemented for the section.

11. The device of claim 7, wherein the one or more processors, to perform the one or more actions, are configured to:

generate recommendations identifying updates or modifications to one or more power sources for the section; and provide the recommendations for display.

12. The device of claim 7, wherein the one or more processors, to utilize the quantum computer and the power optimizer model with the input data associated with the section to determine the optimized power insights for the section, are configured to:

determine priorities for a section population identified in the demographic data, section industries identified in the industry data, section problems identified in the problem data, and section technologies identified in the technology data; and utilize the quantum computer and the power optimizer model with the priorities associated with the section to determine the optimized power insights for the section.

13. The device of claim 12, wherein a priority associated with the problems includes a greatest priority when the problems are associated with a manmade disaster or a natural disaster.

14. A non-transitory computer-readable medium storing a set of instructions, the set of instructions comprising:

one or more instructions that, when executed by one or more processors of a device, cause the device to:

receive input data that includes demographic data, power demand data, power source data, power route data, technology data, industry data, and problem data associated with a geographic location;

identify a section of the geographic location from the demographic data;

identify power sources of the section from the power source data;

estimate power generation and power demand for the section based on the power sources, the power demand data, and the power route data;

determine whether the power demand is greater than the power generation for the section;

determine priorities for a section population identified in the demographic data, section industries identified in the industry data, section problems identified in the problem data, and section technologies identified in the technology data;

utilize a quantum computer and a power optimizer model with the input data and the priorities associated with the section to determine the optimized power insights for the section based on determining that the power demand is greater than the power generation for the section, wherein the one or more instructions, that cause the device to utilize the quantum computer and the power optimizer model with the input data associated with the section to determine the optimized power insights for the section, cause the device to:

identify current power routes in the section based on the power route data;

define a quantity of the current power routes for each industry in the section based on the industry data;

assign the quantity of the current power routes to each of the industries in the section;

calculate an optimized power to provide to each of the quantity of the current power routes, wherein the one or more processors, to calculate the optimized power to provide to each of the quantity of the current power routes, are configured to:

identify a power constraint for each quantity of current power routes associated with each of the industry in the section;

identify a quantity of power available for each quantity of current power routes associated with each of the industry in the section;

identify a priority for each quantity of current power routes associated with each of the industry in the section; and combine the identified power constraint, quantity of power available and the priority for each quantity of current power routes associated with each of the industry in the section; and determine the optimized power insights for the section based on calculating the optimized power to provide to each of the quantity of the current power route; and perform one or more actions based on the optimized power insights for the section.

15. The non-transitory computer-readable medium of claim 14, wherein the demographic data includes data identifying a population of the geographic location, sections of the geographic location and including the section, and populations of the sections;

wherein the power demand data includes data identifying power demands of the sections of the geographic location;

wherein the power source data includes data identifying one or more of a nuclear power source, a coal power source, a gas power source, a fuel power source, a hydroelectric power source, a solar power source, or a wind power source associated with the geographic location;

wherein the power route data includes data identifying power routes through sections of the geographic location;

wherein the technology data includes data identifying Internet of Things devices, base stations, and electric vehicles associated with the geographic location;

wherein the industry data includes data identifying one or more industries associated with the geographic location; and wherein the problem data includes data identifying one or more of a new roll out, a planned power outage, a power over production, a power line disruption, a power transmission loss, an unregulated power supply, a power wastage, a power shortage, an unplanned power outage, a manmade disaster, or a natural disaster associated with the geographic location.

16. The non-transitory computer-readable medium of claim 14, wherein the one or more instructions, that cause the device to perform the one or more actions, cause the device to one or more of:

recommend one or more new power sources for the section;

modify parameters of one or more power sources for the section;

identify one or more new power routes for the section; or identify one or more power consumers to limit in the section.

17. The non-transitory computer-readable medium of claim 14, wherein the one or more instructions, that cause the device to perform the one or more actions, cause the device to:

determine an optimized power allocation for the section based on the optimized power insights for the section; and cause the optimized power allocation to be implemented for the section.

18. The non-transitory computer-readable medium of claim 14, wherein the one or more instructions, that cause the device to perform the one or more actions, cause the device to:

generate recommendations identifying updates or modifications to one or more power sources for the section; and provide the recommendations for display.

* * * * *